(12) United States Patent
Egberts

(10) Patent No.: US 6,473,689 B1
(45) Date of Patent: Oct. 29, 2002

(54) METHOD FOR NAVIGATING A VEHICLE

(75) Inventor: Egbert Egberts, Eindhover (NL)

(73) Assignee: Mannesmann VDO AG (DE)

( * ) Notice: Subject to any disclaimer, the term of this patent is extended or adjusted under 35 U.S.C. 154(b) by 99 days.

(21) Appl. No.: 09/655,532

(22) Filed: Sep. 5, 2000

(30) Foreign Application Priority Data

Sep. 21, 1999 (DE) .......................................... 199 45 121

(51) Int. Cl.⁷ .......................... G01S 5/02; G06F 165/00; G06F 15/50
(52) U.S. Cl. ........................ 701/207; 701/214; 340/995; 342/359
(58) Field of Search ................................ 701/213, 214, 701/220, 207, 208, 210, 221, 224, 300; 340/995; 342/357.06, 359, 457

(56) References Cited

U.S. PATENT DOCUMENTS

| | | | | |
|---|---|---|---|---|
| 4,470,124 A | * | 9/1984 | Tagami et al. | 364/571 |
| 4,890,233 A | * | 12/1989 | Ando et al. | 364/457 |
| 5,251,139 A | * | 10/1993 | Takano et al. | 364/454 |
| 5,321,616 A | * | 6/1994 | Okuda et al. | 364/424.05 |
| 5,774,829 A | * | 6/1998 | Cisneros et al. | 701/213 |
| 5,906,653 A | * | 5/1999 | Ichimura et al. | 701/207 |
| 5,928,309 A | * | 7/1999 | Korver et al. | 701/214 |
| 5,969,672 A | * | 10/1999 | Brenner | 342/357.06 |

* cited by examiner

Primary Examiner—Tan Nguyen
Assistant Examiner—Dalena Tran
(74) Attorney, Agent, or Firm—Mayer Brown Rowe & Maw

(57) ABSTRACT

The invention specifies a method for navigating a vehicle, in which an output signal from a direction unit is used to determine the direction by processing a difference from a value (drift) which is valid for travel in a straight line.

The aim of this is to have more accurate values available for direction determination.

The drift is therefore determined by the following steps:
  a) the absolute direction of the vehicle at a first instant is determined using external auxiliary means,
  b) the absolute direction of the vehicle at a second instant is determined using external auxiliary means,
  c) a direction difference is formed from the two absolute directions,
  d) the direction changes ascertained by the direction unit are summed to form a direction sum,
  e) a correction variable is calculated using the direction difference and the direction sum, and
  f) a new drift is formed from a previous drift and the correction variable.

17 Claims, 1 Drawing Sheet

METHOD FOR NAVIGATING A VEHICLE

The invention relates to a method for navigating a vehicle, in which an output signal from a direction unit is used to determine the direction by processing a difference from a mean value which is valid for travel in a straight line.

Such a method is used in a "Carin" navigation system, for example.

The demand for navigation aids has increased continuously in recent years. The aim here is to be able to indicate to the driver of a motor vehicle the best possible route for him to be able to reach the destination from a starting location. In this context, the overall task is divided into three parts, namely determining the position of the vehicle, route planning and transmitting the route to the driver. The present invention relates to the first part, namely determining the position of the vehicle.

To determine the position of the vehicle, navigation satellites forming part of a global positioning system or GPS have been available for some time. Although the satellite can be used everywhere to determine a location or position with few restrictions, the accuracy which they are able to achieve is only within a range of 100 m. For inter-urban journeys, this may be sufficient in most cases. However, this "inaccuracy" is critical where the distance between roads is less than this magnitude, for example in towns or at traffic junctions, where a number of roads meet one another within a relatively short distance.

Hence, in particular fields, the use of "compound navigation" has taken over, where the position of the vehicle is determined by ascertaining the direction and distance from a starting point. The current position of the vehicle is thus ascertained by a type of vector addition. Such a method is also called dead reckoning. However, in this method, errors which arise in the case of any vector formation add up, which means that the risk is also run here of not being able to determine the position of the vehicle with the desired degree of accuracy.

For direction determination, gyroscopes are used in the known case. Gyroscopes produce an output signal for which the term "drift" has been introduced when the vehicle is traveling in a straight line or is at a standstill, i.e. there is no change in direction. When the vehicle changes direction, a change in the output signal is produced which is dependent on the angular speed $\omega$ of the vehicle. By integrating the discrepancy between this signal and the drift over time, the change in direction can then be ascertained.

The mean value of the output signal, that is to say the drift, which is valid for travel in a straight line, is not constant in many cases. It varies between individual instances of gyroscopes, and also with temperature in the case of an individual gyroscope. The cheaper the gyroscopes, the less it is possible to rely on the mean value valid for travel in a straight line actually being constant. The term "mean value" does not mean that the value for travel in a straight line must be exactly in the middle between the lowest and the highest output value of the gyroscope. It merely intends to convey that travel in a straight line is in the middle between the two possible changes in direction to the left and to the right, and accordingly the output signal of the gyroscope when the vehicle is traveling in a straight line is between the output signal for a change in direction [lacuna]. Although the drift can be determined at the start of a journey when the vehicle is at a standstill, this drift will change over the course of time, for example as a function of temperature. This response is generally unknown, however. The difference between the actual drift and the assumed drift is called the drift error.

When a drift error occurs, the navigation system calculates a change in direction, for example, even though the vehicle is traveling in a straight line.

The invention is based on the object of providing more accurate values for determining direction.

This object is achieved for a method of the type mentioned in the introduction as a result of the drift being determined by the following steps:

a) the absolute direction of the vehicle at a first instant is determined using external auxiliary means, b) the absolute direction of the vehicle at a second instant is determined using external auxiliary means, c) a direction difference is formed from the two absolute directions, d) the direction changes ascertained by the direction unit are summed to form a direction sum, e) a correction variable is calculated using the direction difference and the direction sum, and f) a new drift is formed from a previous drift and the correction variable.

The external auxiliary means are means which are neither influenced by the gyroscope or another direction unit nor influence the same. They can be arranged inside or outside of the vehicle. This correction is used to check whether the sum of the direction changes ascertained by the gyroscope matches the difference between two directions at the start and at the end of the checking period. In the simplest case, at the first instant, the vehicle is traveling in the same direction as at the second instant. In between, virtually any wavy lines or bends can be taken by the vehicle. In this case, the direction unit would have to output positive and negative direction changes, so that the direction sum, that is to say the sum of the positive and negative direction changes, produces zero again. In this case, it is assumed that the drift is correct, i.e. a value which is actually representative of travel in a straight line is assumed as the mean value for travel in a straight line. On the other hand, if the direction difference and the direction sum do not match, then it is assumed that there is a drift error. In this case, the calculated drift can be corrected. Since the actual output signal of the gyroscope cannot be altered in most cases, the correction is generally made by computer.

In one preferred refinement, the new drift is formed from a previous drift plus a quotient of the difference between the direction difference and the direction sum and the period of time between the two instants. In this case, the variables ascertained during monitoring are simultaneously used to correct the drift. If there is no difference between the direction difference and the direction sum, then the new drift matches the old drift. There is therefore no correction made in this case, since one is not necessary. If, on the other hand, differences do arise between the direction difference and the direction sum, then it is assumed that they have developed uniformly over time. It is therefore possible to calculate a correction value based on time, said correction value being added to the previous, that is to say incorrect drift. In this way, direction correction is possible using very simple measures.

Preferably, the external auxiliary means used are satellites. Although position determination using satellites is relatively inaccurate, direction determination using satellites is much more accurate. The navigation satellites are usually evaluated at an interval of one second, that is to say at a frequency of 1 Hz. It can thus be assumed that the systematic error has not changed substantially in this short period. If the same position determination is now carried out twice in quick succession, this error can be calculated by difference formation. In this case, the direction is produced with a relatively high degree of accuracy. The direction can also be ascertained by means of the Doppler effect.

As an alternative or in addition to this, the external auxiliary means used can be roads on which the vehicle is depicted. The depiction of the vehicle on the roads is, of course, nothing more than a virtual procedure. However, the coordinates of the virtual roads match the coordinates of the roads which are actually present. This procedure is also known as map matching. In this context, it is assumed that a vehicle will, with a relatively high degree of probability, be moving on a road when such a road is situated close to positions which, by way of example, have been ascertained by compound navigation or using satellites. In many cases, this procedure provides sufficiently accurate statements, at least for direction determination, because the direction of the road is fixed and the position of the vehicle on the road can be determined with sufficient accuracy using map matching.

The roads are preferably stored in a database. This simplifies evaluation using a computer, which can be carried on the vehicle.

Advantageously, a predetermined minimum time is observed between the first and second instants. This minimum time can be 125 sec., for example. This waiting time has two advantages. First, it keeps the computational requirement for checking low. Secondly, a drift error can be determined more accurately after a certain waiting time. Accordingly, better correction is also possible.

Preferably, correction is not carried out if a mean angular speed exceeds a predetermined value. By way of example, it is not carried out if the direction of a vehicle has changed by 3°/sec. or more. This is because, in this case, a further error could arise, namely a scaling factor error.

Preferably, the direction difference is subjected to a plausibility check. The direction difference can, as mentioned above, be formed, by way of example, by twice ascertaining the absolute direction with respect to navigation satellites. As an alternative to this, the absolute direction can be ascertained twice using map matching. Finally, it is also possible to ascertain one absolute direction with respect to a navigation satellite, on the one hand, and to use map matching at the other instant. In all cases, one or even both instances of the absolute direction being ascertained may be subject to error, for example if the signal from the satellite does not reach the vehicle directly, but rather via a reflection on a wall. In this case, the delay time is no longer correct. If this means that it is highly probable that the direction difference is not correct, then this direction difference is discarded and not used for correction.

Advantageously, the invention provides for the change in the drift error or drift change to be subjected to a plausibility check. In this case, it is assumed that the two absolute directions are ascertained accurately only in an ideal situation. The drift change is assumed to have its largest known value to date or it is assumed to have the previous value, which may already have been corrected or is ascertained by model formation. The drift change integrated over time between the two instants produces a possible drift change. If the calculated drift change now exceeds the possible drift change, it is probable that one of the two absolute directions is not correct.

Another preference is that, each time the absolute direction is determined, this absolute direction is used as the new output variable for compound navigation. Thus, the absolute direction is used as the new direction in compound navigation. This improves navigation overall.

In one preferred refinement, the invention provides for the drift change to be determined dynamically using an ascertained drift rate. Even if there is no possibility of correction over a relatively long period of time, it is also possible to estimate the drift change in order to make it the basis for evaluation.

In this case, it is preferable for the drift rate to be filtered. This minimizes the risk of "outliers" corrupting the result.

The invention is described in more detail below with the aid of a preferred illustrative embodiment in conjunction with the drawing, in which.

Figure 1:
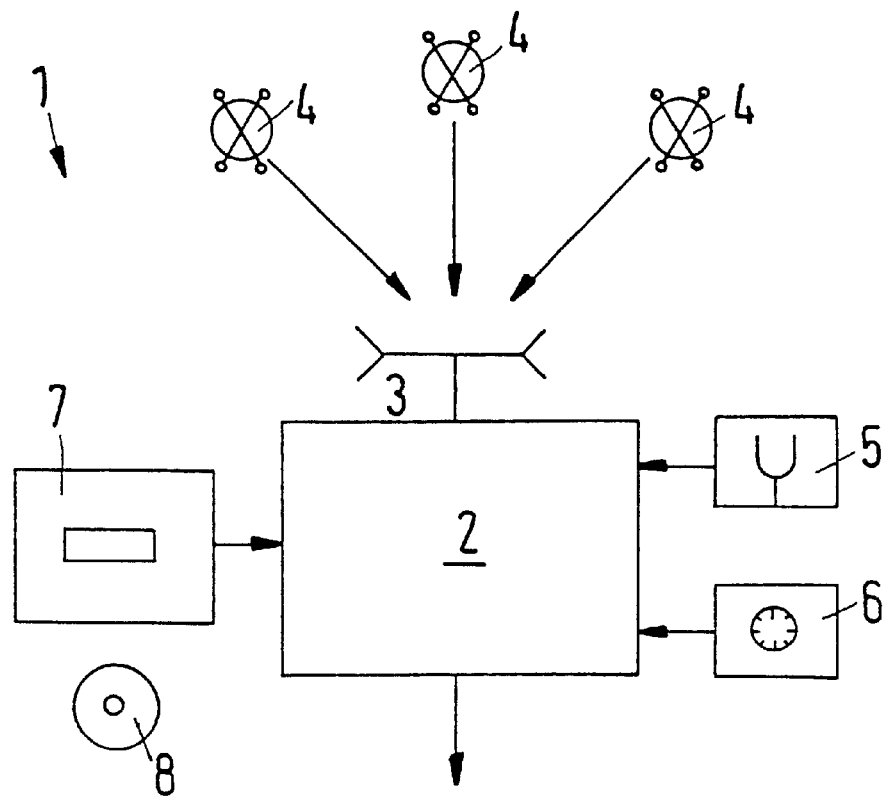
FIG. 1 shows a schematic illustration of a navigation system.

A system 1 for navigating a vehicle is shown with just one part, which is concerned with position determination. A processing device 2 is connected to an antenna 3 which receives signals from navigation satellites 4. The signals from the satellites are evaluated at an interval of one second, that is to say at a frequency of 1 Hz. The delay time of these signals can be used to calculate the distance from the satellites 4. If the distance from at least three satellites is known, then it is possible to calculate the position of the vehicle on the earth. This position is subject to certain errors, however.

In addition, the processing device 2 is connected to a schematically illustrated gyroscope 5 for direction determination. Finally, a tachometer 6 is also connected to the processing device and informs the processing device 2 of the distance covered.

The processing device 2 is connected to a database 7 (likewise illustrated schematically) which may also be formed by a reader for a data medium 8, for example a CD-ROM. The database 7 can store roads such that they can be utilized by the processing device 2, or example a computer. The processing device 2 can, by way of example, depict the current position of the vehicle on the road on which the vehicle is currently situated. This procedure is also called map matching. The database 7 is also used for route planning, but this is of secondary importance in the present case.

To determine the location or position of the vehicle, the system makes considerable use of so-called compound navigation, which is also referred to as dead reckoning. The system ascertains what distance is being covered by the vehicle in which direction, starting from a known location. The distance is ascertained using the tachometer 6, and the direction is ascertained using the gyroscope 5. The current position of the vehicle can be determined by vectorial addition of the individual distances in a particular direction.

When the vehicle is traveling in a straight line, the gyroscope 5 should ideally output a constant voltage of 2.5 V, for example. This constant output voltage of the gyroscope 5 is also called drift.

Figure 2:
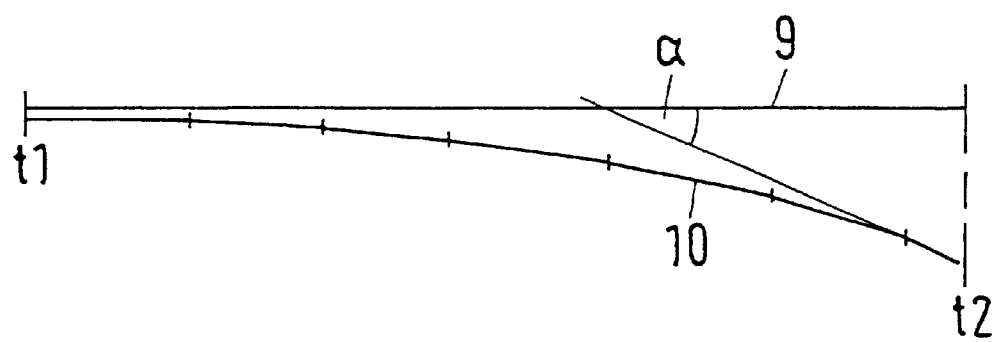
FIG. 2 shows a sketch to illustrate the correction.

FIG. 2 shows a stretch of road 9 on which the vehicle is traveling in a straight line. Shown next to this is a calculated road 10 which the system 1 has ascertained on the basis of the direction change signals from the gyroscope 5 and the distance measurement from the tachometer 6.

However, the gyroscope 5 actually has a small drift error, i.e. the output voltage which it outputs when the vehicle is traveling in a straight line deviates from 2.5 V and is, for example, 2.55 V. This is interpreted by the system 1 as if the vehicle is taking a shallow bend.

This drift error can now be corrected.

To do this, the system determines the absolute direction of the vehicle at an instant t1, for example using the satellites 4 or using the database stored on the CD-ROM 8. In the latter case, the system 1 "presumes" that the vehicle is situated on a road which is closest to the calculated position. Since the direction of the road is known, it assumes that the vehicle is also moving in this direction.

At a predetermined time, in the present case at least 125 sec. later, the system 1 determines the absolute direction again at an instant t2. Since the road 9 runs straight on in the present case, the direction at the instant t2 is the same as that at the instant t1. There is therefore no direction difference between the absolute directions.

The situation appears different when the calculated stretch of road 10 is considered. In this case, there has been a series of direction changes whose size has been exaggerated in the drawing for the purposes of clear illustration. After 125 sec., the direction changes have added up to form an angle of 25° overall. Accordingly, the drift D of the gyroscope needs to be corrected by 0.2°/sec. This follows from the formula below, for example:

$$D_{new} = D_{old} + \frac{\alpha}{t2 - t1}$$

In this equation, $D_{new}$ is the new drift, $D_{old}$ is the previously used drift and $\alpha$ is the value produced from the difference in the sum of the direction changes and the difference in the absolute directions.

The direction is then ascertained further using the gyroscope 5 with the new drift $D_{new}$, i.e. a direction change is assumed only if the output signal from the gyroscope 5 differs from the value $D_{new}$. This correction can also be made only when the output signal from the gyroscope 5 is evaluated. The direction which the system uses for compound navigation is set to the absolute direction both at the instant t1 and at the instant t2.

$D_{new}$ is not calculated if the result of a plausibility check is that one of the two values is obviously incorrect. Such an error can arise both in the case of direction determination with respect to a satellite and using map matching. Such an error is. assumed whenever the calculated drift error exceeds the possible drift error.

In this case, the drift is not corrected.

In many cases, it is advantageous if the drift rate, i.e. the change in the drift over time, is determined. In this context, it is particularly advantageous if the drift rate is also filtered. In this case, the filtered value can be formed, by way of example, by setting $$DR_{Filter} = e^{-t/\tau} \cdot DR_{old} + (1 - e^{-t/\tau}) \cdot DR_{new}$$

In the above equation, t is the time difference between two instances of drift rate determination and $\tau$ is a predetermined value of 300 sec., for example.

The calculated drift error at time t can now be matched dynamically by using the following equation:

$$DA(t + \Delta t) = DA(t) - \int_0^{\Delta t} DR_{Filter} e^{\frac{-t}{\tau}}$$

where DA is the drift error, $\Delta t$ is the length of time since the last correction at time t, and $\tau$ is a predetermined constant, for example 300 sec. as for the filtering or else 500 sec. The useful value can easily be ascertained by trial.

What is claimed is:

1. A method for navigating a vehicle, in which an output signal from a direction unit is used to determine the direction by processing a difference from a value (drift) which is valid for travel in a straight line, wherein the drift is determined by the following steps:
   a) the absolute direction of the vehicle at a first instant is determined using external auxiliary means,
   b) the absolute direction of the vehicle at a second instant is determined using external auxiliary means,
   c) a direction difference is formed from the two absolute directions,
   d) the direction changes ascertained by the direction unit are summed to form a direction sum,
   e) a correction variable is calculated using the direction difference and the direction sum, and
   f) a new drift is formed from a previous drift and the correction variable.

2. The method as claimed in claim 1, wherein the new drift is formed from the previous drift plus a quotient of the difference between the direction difference and the direction sum and the period of time between the two instants.

3. The method as claimed in claim 1, wherein the external auxiliary means used are satellites.

4. The method as claimed in claim 1, wherein the external auxiliary means used are roads on which the vehicle is depicted.

5. The method as claimed in claim 4, wherein the roads are stored in a database.

6. The method as claimed in claim 1, wherein a predetermined minimum time is observed between the first and the second instant.

7. The method as claimed in claim 1, wherein correction is not carried out if a mean angular speed exceeds a predetermined value.

8. The method as claimed in claim 1, wherein the change in the drift error or drift change is subjected to a plausibility check.

9. The method as claimed in claim 1, wherein, each time the absolute direction is determined, this absolute direction is used as the new output variable for compound navigation.

10. The method as claimed in claim 1, wherein the drift change is determined dynamically using an ascertained drift rate.

11. The method as claimed in claim 10, wherein the drift rate is filtered.

12. A method for navigating a vehicle, in which an output signal from a direction unit is used to determine the direction by processing a difference from a value (drift) which is valid for travel in a straight line, wherein the drift is determined by the following steps:
   a) the absolute direction of the vehicle at a first instant is determined using satellites and roads on which the vehicle is depicted, wherein the roads are stored in a database,
   b) the absolute direction of the vehicle at a second instant is determined using satellites and roads on which the vehicle is depicted,wherein the roads are stored in a database, and wherein a predetermined minimum time is observed between the first and the second instant, c) a direction difference is formed from the two absolute directions, d) the direction changes ascertained by the direction unit are summed to form a direction sum, e) a correction variable is calculated using the direction difference and the direction sum, and f) a new drift is formed from a previous drift and the correction variable, wherein the new drift is formed from the previous drift plus a quotient of the difference between the direction difference and the direction sum and the period of time between the two instances.

13. The method as claimed in claim 12, wherein correction is not carried out if a mean angular speed exceeds a predetermined value.

14. The method as claimed in claim 13, wherein the change in the drift error or drift change is subjeted to a plausibility check.

15. The method as claimed in claim 14, wherein, each time the absolute direction is used as the new output variable for compound navigation.

16. The method as claimed in claim 15, wherein the drift change is determined dynamically using an ascertained drift rate.

17. The method as claimed in claim 16, wherein the drift rate is filtered.

* * * * *